United States Patent [19]
Dahlqvist et al.

[11] 3,875,330
[45] Apr. 1, 1975

[54] DEVICE FOR CONTROLLING THE SCANNING IN AN INFRA-RED IMAGING SYSTEM

[75] Inventors: Jan Dahlqvist, Akersberga; Bo Matsson, Marsta; Benny Johansson, Sollentuna, all of Sweden

[73] Assignee: AGA Aktiebolag, Lidingo, Sweden

[22] Filed: Mar. 5, 1974

[21] Appl. No.: 448,219

[30] Foreign Application Priority Data

Mar. 6, 1973 Sweden .......................... 73030751

[52] U.S. Cl. .............. 178/7.1, 178/7.6, 178/69.5 F, 178/DIG. 8, 178/DIG. 27, 250/334

[51] Int. Cl. ........................H04n 3/10, H04n 5/06

[58] Field of Search......... 178/7.6, DIG. 8, DIG. 27, 178/7.1, 69.5 F; 250/334; 350/7, 99, 289

[56] References Cited

UNITED STATES PATENTS

| | | | |
|---|---|---|---|
| 3,730,985 | 5/1973 | Whitney | 178/DIG. 8 |
| 3,804,976 | 4/1974 | Gard | 250/334 |

*Primary Examiner*—Howard W. Britton
*Attorney, Agent, or Firm*—Lerner, David, Littenberg & Samuel

[57] ABSTRACT

A device for controlling the scanning in an infra-red imaging system (IR-imaging system) comprising an IR-camera and an image representation unit, the IR-camera being provided with a first scanning part, comprising a frame scanning unit rotating by means of an electric motor with a frame trigger unit, and a second scanning part comprising a line scanning unit rotating by means of an electric motor with a line trigger unit.

7 Claims, 1 Drawing Figure

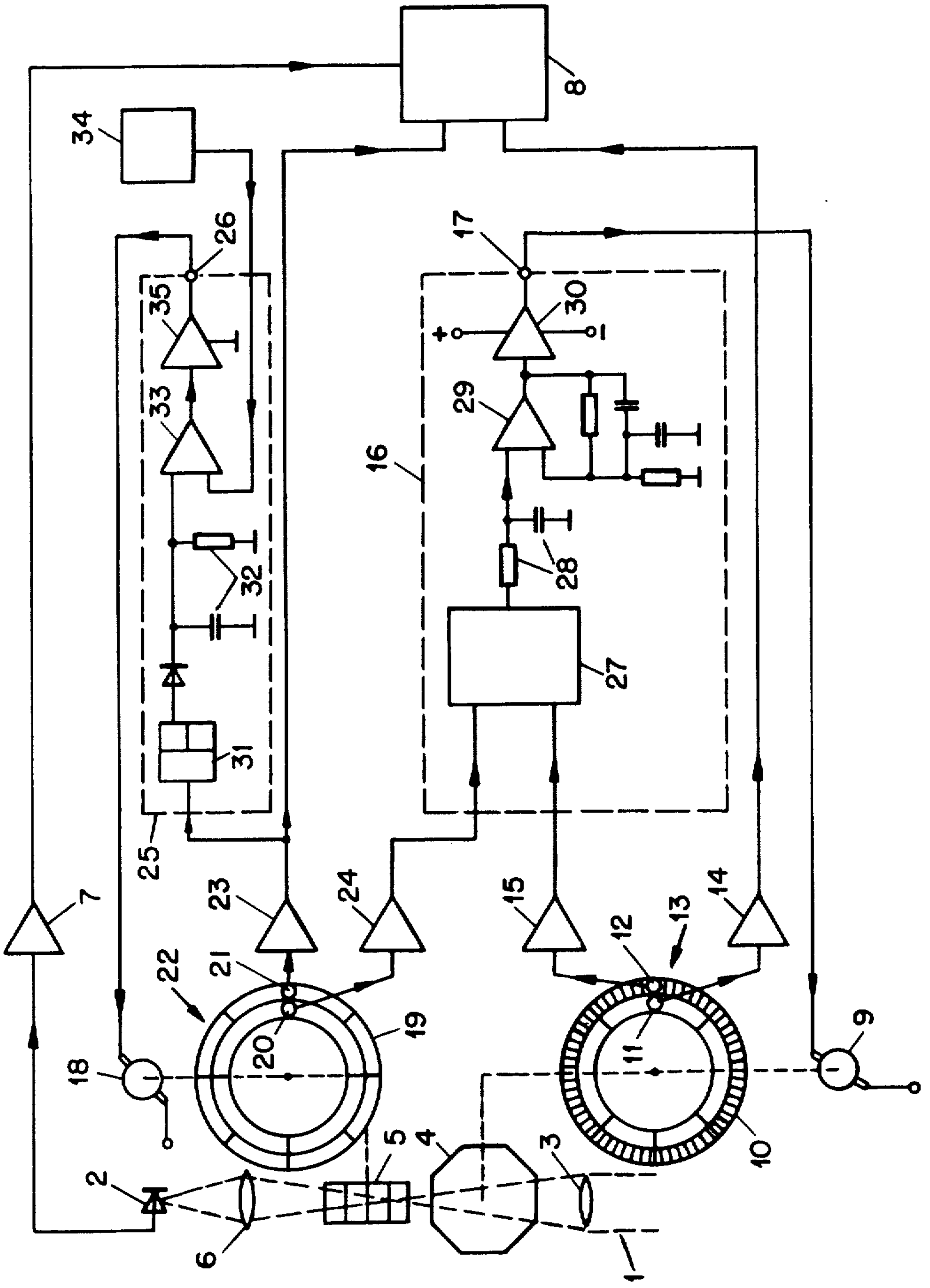
1
2
3
4
5
6
7
8
9
10
11
12
13
14
15
16
17
18
19
20
21
22
23
24
25
26
27
28
29
30
31
32
33
34
35
+
−

DEVICE FOR CONTROLLING THE SCANNING IN AN INFRA-RED IMAGING SYSTEM

BACKGROUND OF THE INVENTION

The line raster in the image presented by means of the image representation unit and then generally on a cathode- ray tube, can be built up of two sweeps, one in a horizontal direction (line sweep) and one in a vertical direction (frame sweep). The sweep starts are obtained by trigger signals from an optical-mechanical scanning unit. The scanning is carried out by means of two rotary motions, one horizontal and one vertical. The scanning device consists of rotating prisms of, for example, silicon, but scanning devices are also used which comprise mirrors and rotating reflecting drums.

To obtain the best possible image of the scanned object, a high scanning frequency is aimed at. The maximum scanning frequency is limited by the mechanical system, the scanning frequency being chosen highest for the horizontal movement. At one revolution of, for example, the line scanning unit the object is scanned a certain number of times depending upon the scanning unit. In order to obtain good pictorial quality of the image, high demands are made on the precision of the means for driving the scanning units. It is required that the angular velocity of the two scanning units should be extremely constant. Even very small fluctuations in the angular velocity, which are very difficult to measure, have a notable effect on the pictorial quality. When photographing the picture on the cathode-ray tube it is moreover desirable to have a large number of lines per frame so that the line pttern should not have a disturbing effect on the image. This can be achieved by making use of a so-called interlacing process (sliding line raster), where an image is built up of a certain number of fields which are displaced in relation to one another. The interlacing process raises further demands on precision of the driving.

In known systems with a horizontal and a vertical rotating scanning unit these units are driven by a common electric motor, the scanning units being maintained at mutually different constant speeds by means of a mechanical gear. Such an arrangement has several disadvantages. A mechanical gear implies that the scanning system will have a high noise level. Furthermore, in such a gear there are often variations in the tooth pieces, pitch errors and bearing friction which give rise to variations in the angular velocity. The said faults occur practically always in mechanical gears in spite of their being made with high precision. The errors are aggravated through the wear of the gear.

SUMMARY OF THE INVENTION

By means of the device in accordance with the invention these disadvantages are overcome by arranging the motors without any play directly on the motor axles. Thus, instead of having a mechanical linkage between the scanning units, two motors are provided, one motor having a reference signal applied to the control thereof, and the other motor, using as its reference signal, the speed of the first motor.

DETAILED DESCRIPTION OF THE DRAWINGS

The invention will be described in detail with the help of the enclosed drawing which, schematically in block form, shows an infra-red imaging system, where the parts necessary for the understanding of the invention are shown in greater detail than the other parts included in the system.

On the drawing the scanning unit comprises two prisms rotating at right angles to one another. One of them scans the object in a horizontal direction and is called the line scanning unit and the other scans the object in a vertical direction and is called the frame scanning unit. From an object (not shown in the figure) infra-red radiation 1 is received onto an IR- detector 2. In front of the IR-detector, in the path of the radiation, there is first a front lens 3 and thereafter the frame scanning unit 4 and the line scanning unit 5. These two scanning units consist, for example, of octagonal silicon prisms. Immediately before the IR-detector 2 there is a further lens system 6. From the IR-detector 2 the signal is passed to an amplifier 7 and from there a video signal is transmitted to the image representation unit 8.

The frame scanning unit 4 which scans the object in vertical direction is driven by an electric motor 9. On the motor axle, in addition to the said scanning unit, is also arranged a code disc 10. The code disc 10 is provided with alternating light and dark, transparent and non-transparent fields arranged in two channels, said channels being scanned in that two light-producing elements, for example, light emitting diodes, are arranged one above each channel and in that two light-sensitive elements 11 and 12, for example, photocells, are arranged underneath each channel to receive light from said light producing element when a transparent field passes in the code disc. Naturally, code discs with alternating reflecting and non-reflecting fields may be used, when the light source and the photocell are placed on the same side of the code disc. The code disc 10 with pick-up elements are included in a unit called frame trigger unit 13. The signals from the light-sensitive element 11 are transmitted to an amplifier 14 and from there to the image representation unit 8, these signals serving as frame trigger signals. The signals from the light-sensitive element 12 are transmitted via an amplifier 15 to a control system 16 for frame scanning. From the output 17 of the system 16 a signal is obtained for the driving of the motor 9.

The line scanning unit 5 is driven by an electric motor 18, on whose axle a code disc 19 is also arranged. Similar to the code disc 10 described above, the code disc 19 is provided with two channels which are scanned in that two light-producing elements, for example, light emitting diodes, are arranged one above each channel, and in that two light-sensitive elements 20 and 21, for example, photo-cells, are arranged underneath each channel to receive light from the light-producing elements when a transparent field passes in the code disc. The code disc 19, and the light-sensitive elements 20 and 21, are included in a line trigger unit 22. From the light-sensitive element 21 signals are transmitted via an amplifier 23 to the image representation unit 8, these signals constituting the line trigger signals. The signal from the light-sensitive element 20 is transmitted via an amplifier 24 to the control system 16.

The line trigger signal from the amplifier 23 is fed to the image representation unit 8 as well as to a control system 25 for the line scanning. From the output 26 of the control system 25 control signals are transmitted to the motor 18, said motor driving the line scanning unit 5 and the code disc 19.

As mentioned earlier, the control system 16 for frame scanning is fed with signals from both the line trigger unit 22 and the frame trigger unit 13. Both these signals are transmitted to a frequency detector 27 included in the control system 16. This frequency detector 27 is connected to an amplifier 29 provided with an integrating circuit 28. This amplifier has a certain frequency characteristic which is optimized with respect to rapid regulation and small overshoot. Said amplifier 29 feeds an exciter 30 which is directly connected to the output 17 of the control system.

As mentioned earlier, a signal from the trigger unit 22 is supplied to the control system 25 for line scanning. This signal is formed in the control system 25 by a pluse-forming circuit 31 said circuit being connected via a rectifying and integrating circuit 32 to the one input of a comparator 33 provided with two inputs. To the other input of this comparator 33 a reference signal from a reference signal source 34 is supplied. Said comparator 33 is connected via an exciter 35 to the output 26 of the control system 25. The signal on this output 26 is used to drive and control the motor 18.

The line scanning unit 5 scans the object in a horizontal direction. This scanning will take place at a certain speed and a certain number of times per unit of time. In relation to this scanning a line trigger signal will be supplied to the image representation unit for the control of the same in a known manner.

The line scanning unit 5 is driven by means of an electric motor 18, whose speed is controlled by the reference signal from the reference signal source 34. The reference signal is compared with a signal which is derived from the code disc 19 and which has a frequency in direct relation to the speed of the motor 18. In the present example, the code disc is made up of alternately transparent and non-transparent fields, on account of which the signal from the code disc consists of pulses. Depending on the speed of the motor the pulses will have different lengths. These pulses are converted in the pulse-forming circuit 31 to obtain constant duration. It is thus only the distance between the pulses which varies as a function of the speed of the motor. This pulse-forming circuit 31 may consist for example of a monostable flip-flop. The comparator 33 in the control system 25 for the line scanning is thus supplied with on the one hand a reference signal in the form of a d.c. voltage, and on the other hand a signal which, when issued from the pulse-forming circuit, consists of pulses. Before these pulses are supplied to the comparator 33 they have to be smoothed so that the signal consists only of a d.c. voltage which is proportional to the pulses. This smoothing takes place in the rectifying and integrating circuit 32. From the comparator 33 a d.c. voltage signal is obtained, whose amplitude varies with the difference between the input signals of the comparator. The exciter 35 is controlled by the said d.c. voltage.

The control system for frame scanning operates in the following manner: The frame scanning unit 4 is driven by the electric motor 9 which receives driving signals from the control system 16. Similarly to what has been said earlier in connection with the line scanning the image representation unit 8 receives a frame trigger pulse from the code disc 10 which rotates with the frame scanning unit 4. The code disc 10 also produces a signal which consists of pulses whose length and distance depend on the speed of the driving motor 9 of the frame scanning unit 4. This signal is fed to a frequency detector 27 where it is compared with a signal which is delivered from the code disc 19 of the line scanning unit. The frequencies of the two signals are compared in the frequency detector 27 and a signal is obtained from the frequency detector in the form of pulses, whose length and distance depend on the frequency difference of the signals mentioned earlier.

The signal coming from the circuit 29 consists of pulses which are amplified in the exciter 30 and are fed to the motor 9. The driving signals for the motor 9 from the control system 16 contain alternating positive and negative pulses. The motor 9 can be an ordinary d.c. motor and it is assumed that it will rotate in the direction which is given by positive voltage from the control system. The motor will then rotate in the dorrect direction as long as the positive pulse energy is greater than the negative one. By also feeding negative pulse energy to the motor a tighter control of the motor is obtained. It is important that this motor reacts rapidly when it is a matter of increasing or decreasing the speed. The control system that has been described operates essentially so that a reference signal from the reference signal source controls the line scanning unit which in turn controls the frame scanning unit.

Naturally it is possible to control the motor of the frame scanning unit in the same manner as the motor of the line scanning unit is controlled, but such a control will cause the motor of the frame scanning unit to react slower on the control signals. This means that an inferior synchronization between the two motors will be obtained.

On the other hand it is possible to control the motor of the line scanning unit with a control system similar to that which controls the motor of the frame scanning unit. This is unnecessary, however, since the demand for precision in respect of the motor of the line scanning unit following the reference signal is not as great as the demand for precision regarding the follow-up action of the motor of the frame scanning unit.

Difficulties arise frequently at the starting up of the system if the same comprises a frequency detector in such a manner as the control system 16. This is due to the fact that the detector cannot become stable since the two incoming signals to the detector lie very much apart in phase. It is known, however, that in cases where incoming signals have a very different phase, a combined frequency and phase detector can be used instead. As a result the output signal of the detector in this case will endeavor to control the motor so that the incoming signals during the starting up will obtain the same frequency, and only when the incoming signals of the detector lie relatively close to one another in phase the detector is phase-sensitive. In other words, such a combined frequency and phase detector causes the control system to have a coarse and a fine adjustment system.

By means of the device in accordance with the invention it is made possible, as mentioned in the preamble to the description, to synchronize the two scanning devices in a simple and reliable manner. Furthermore, it is possible in a simple manner to change the interlacing number or the sweep velocity by substituting the code discs in the trigger units.

With a system in accordance with the FIGURE there is relatively great freedom in the selection of the interlacing number and the line number by substitution of the code discs. If the number of sides in the line scanning prism is designated $A_l$ and the corresponding number on the frame scanning unit $A_b$, and the number of fields per frame, which is equal to the interlacing number, is designated $n$ and the number of lines per field is designated N, the number of dark fields, which is equal to the number of transparent fields, on the code discs in the different channels will be as follows: In the line trigger unit the outer channel, that is to say that which generates line trigger pulses to the image representation unit, will have a number $A_l$ of dark fields, and the inner channel, which is used for the control of the frame scanning unit will have $n$ dark fields. In the frame trigger unit the outer channel, that is to say that which is included in the control system for the frame scanning unit will have $n \cdot N$ fields, and the inner channel, which generates frame trigger signals, will have a number $A_b$ of fields.

In the particular embodiment as shown in the FIGURE, where both the scanning units have eight sides, we have therefore $A_l = A_b = 8$, and the interlacing number $n$ has been chosen to be 4; the outer channel of the code disc in the frame trigger unit will, therefore, have 401 dark fields if the number of lines per field (N) is chosen to 100 1/4.

If the need to be able freely to vary the parameters is less than indicated above it may often be sufficient to have only one channel in the code disc of the line trigger unit. In this case this channel will have a number of fields equal to the number of sides of the scanning unit belonging to the code disc, which corresponds to the number of scannings per revolution of the scanning unit. The signal from this code disc will then be fed to the blocks which in the FIGURE are designated 8, 25 and 27 via the amplifier 23. Before the signal is supplied to the frequency detector 27 it is divided by 2 in a divider. The realization and connection of the frame trigger unit will be retained as in the FIGURE. This simplified design can be applied if the number of scannings per revolution (number of sides on the line and frame scanning unit which must be equal) is evenly divisible by the interlacing number $n$.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. A device for controlling the scanning in an infrared imaging system comprising an IR-camera and an image representation unit, said IR-camera being provided with a first scanning part comprising a frame scanning unit rotated by means of an electric motor with a frame trigger unit and a second scanning part comprising a line scanning unit rotated by means of an electric motor with a line trigger unit, said frame trigger unit and said line trigger unit each comprising a code disc provided with one or more channels, coupled mechanically to the respective frame and line scanning units each of said code discs rotating at the same speed as its associated scanning unit, said trigger units being adapted to generate signals frequency-dependent upon the pattern and rotational speed of the code discs and forming trigger signals for the image representation unit, said signal from said respective trigger units being supplied to respective frame and line control systems, together with a reference signal for the control of the rotational speed of said scanning units, said reference signal being supplied to one of said control systems with the reference signal for the other of said control systems being generated by the trigger unit associated with the said one of said control systems.

2. A device for controlling the scanning in an infrared imaging system of claim 1, wherein said frame scanning unit includes a prism having $A_l$ sides and said line scanning unit includes a prism having $A_b$ sides, said line trigger unit and said frame trigger unit generating $A_l$ trigger signals to said image representation unit, and said frame trigger unit generating $A_b$ trigger signals to said image representation unit.

3. A device for controlling scanning in an infra-red imaging system of claim 2, wherein said other control system is associated with said frame scanning unit, said line trigger unit supplying $n$ pulses with each rotation of said line trigger unit, where $n$ is equal to the interlacing number or number of fields per frame, the number of lines per field being designated as N, said frame trigger unit supplying to said frame control system $n \cdot N$ trigger signals.

4. A device for controlling the scanning of an infrared imaging system in accordance with claim 1, wherein said one control system is the control system for said line scanning unit.

5. A device for controlling the scanning in an infrared imaging system in accordance with claim 4, wherein said trigger signal from said line scanning unit and said trigger signal from said frame scanning unit are supplied to a frequency detector in said control system, the output of said frequency detector being in the form of pulses, whose length and distance depend on the frequency difference between the respective trigger signals supplied to the input thereof.

6. A device for controlling the scanning in an infrared imaging system of claim 5, wherein the output of said frequency detector contains alternating positive and negative pulses, said motor for driving said frame scanning unit being a d.c. motor.

7. A device for controlling the scanning in an infrared imaging system of claim 5, wherein said frequency detector includes phase detection means for start-up control.

* * * * *